Dec. 9, 1969   R. E. GAYLE   3,482,843
SEAL FOR A ROTATING SHAFT
Filed April 5, 1967
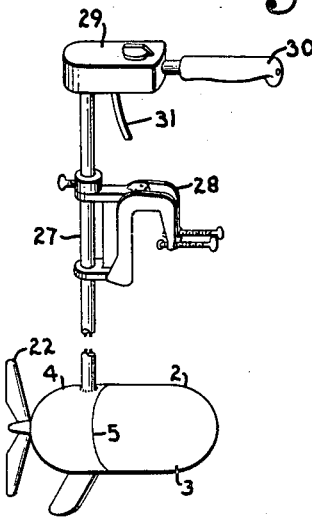
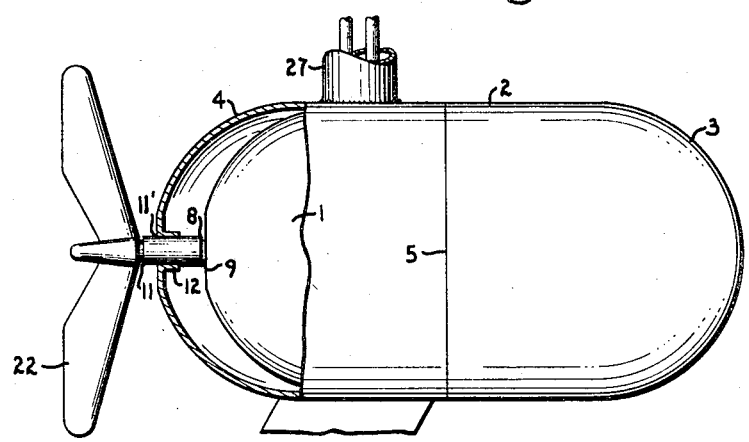
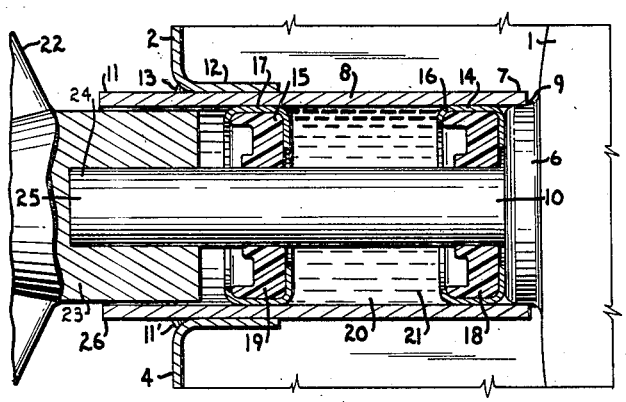
INVENTOR.
ROBERT E. GAYLE
BY
ATTORNEYS

United States Patent Office 3,482,843
Patented Dec. 9, 1969

3,482,843
SEAL FOR A ROTATING SHAFT
Robert E. Gayle, Shawnee Mission, Kans., assignor, by mesne assignments, to Shakespeare Company, Kalamazoo, Mich., a corporation of Delaware
Filed Apr. 5, 1967, Ser. No. 628,612
Int. Cl. F16j *15/40;* B65d *53/00*
U.S. Cl. 277—59                                    2 Claims

ABSTRACT OF THE DISCLOSURE

The present invention relates to means for sealing the shaft of a motor operated under water, such as for movement of a boat when used for trolling, and particularly the shaft to the motor to prevent moisture from entering the motor housing, and also to prevent debris from being wound on the propeller shaft, such as loose strings, weeds, or other material found in the water of a lake or stream.

---

Various attempts have heretofore been made to seal the shaft of a propeller to the motor wherein the motor is operated under water for movement of a boat, such as is used for trolling, while fishing. Insofar as applicant is aware, no one has been able to devise a seal for the shaft which will absolutely prevent moisture from entering the motor housing.

It is a principal object of the present invention to provide a housing for the motor, such as an electric motor, having a hub thereon wherein a sleeve member has one end swaged over the housing and having walls spaced from the propeller shaft, and having spaced sealing members surrounding the shaft inside the sleeve, and wherein the space between the sealing members contains a lubricant for lubricating the shaft and also preventing moisture from passing therealong to the motor.

Other objects of the present invention are to provide a housing for the motor and a portion of the housing extending forwardly around the sleeve and shaft of the motor and having a fluidtight engagement of the portion of the housing and the sleeve; to provide a propeller having a shaft portion engaged within one end of the sleeve member, and having a socket in which the free end of the motor shaft is engaged; and to provide a tight fit between the sleeve and shank of the propeller to prevent debris and other matter from winding thereon and interfering with opertaion of the motor and propeller.

Still further objects of the invention are to provide a motor for operation under water having a tubular shaft connected therewith and extending above the water and having a bracket for attaching the shaft to the stern of a boat, and means to manipulate the motor as is the usual practice from the boat.

Other objects and advantages of this invention will become apparent from the following description taken in connection with the accompanying drawings wherein are set forth by a way of illustration and example certain embodiments of this invention.

FIG. 1 is a perspective view of the motor and mounting shaft and bracket for attachment to a boat (not shown).

FIG. 2 is an enlarged partly cross sectional view of the motor, showing the sealing shaft with parts broken away to better illustrate the same.

FIG. 3 is an enlarged cross sectional view particularly illustrating the sealing members on the motor shaft.

Referring more in detail to the drawings:

1 designates a motor having a housing 2 with a rear portion 3 and a forward portion 4 sealed over the motor, as at 5.

The motor 1 has a hub portion 6 on the forward end thereof and adapted to receive an end 7 of a sleeve 8 swaged or pressed thereover, as indicated at 9, to make a fluidtight seal between the end 7 and the hub 6 of the motor. A shaft 10 of the motor extends longitudinally through the sleeve and its outer end extends slightly past the end 11 of the sleeve.

The forward end 4 of the housing for the motor is tapered downwardly and inwardly from the outside and has an opening 11′ and an inwardly extending annular flange or sleeve portion 12. The flange or sleeve 12 has an inner diameter substantially the same as the outer diameter of the sleeve 8, and the sleeve 8 is adapted to extend through the sleeve 12 and is rigidly secured thereto by welding or other means, as indicated at 13.

Located inside of the sleeve 8 are spaced sealing members 14 and 15, the sealing member 14 being adjacent the hub 6 of the motor. The sealing members surround the shaft 10 and are provided with brass or metal backing members 16 and 17 and have an elastic material housed therein and engaging the shaft 10, as indicated at 18 and 19. This elastic material may be rubber, neoprene, or the like. The space 20 between the sealing members 14 and 15 is filled with a non-soluble grease, as indicated at 21, for lubricating the shaft 10 and also preventing liquid from passing along the shaft to the motor.

22 designates a propeller having a stub shaft 23 provided with a socket 24 for receiving the end 25 of the motor shaft 10. The shaft is secured in the socket 24 so that rotation of the shaft will also rotate the propeller. The stub shaft 23 fits closely within the end 26 of the sleeve 8 and thus prevents any debris, such as lines, grass, or other material which might be in the water, from getting wound around the shaft of the motor, but has sufficient clearance to rotate freely.

A tubular shaft 27 is welded or otherwise rigidly secured to the forward portion 4 of the housing and engages through a bracket 28 for fastening of the motor to the stern of a boat (not shown). Mounted on the upper end of the shaft 27 is the usual guide mechanism 29 and handle 30 and also includes an electric line 31 leading from a source of supply (not shown) through the tubular shaft 27 to the motor.

As this mounting bracket and other means form no part of the present invention, it will not be described in detail.

It will be obvious that I have provided an improved sealing device for the shaft of a motor adapted to operate under water to prevent fluid from entering the motor.

What I claim and desire to secure by Letters Patent is:

1. A propeller shaft seal structure for an electric motor and propeller unit for use under water comprising:
    (a) a motor having a stationary hub extending from one end thereof,
    (b) an elongate rotatable driven shaft extending from said hub and having a free end for mounting a propeller,
    (c) an elongate sleeve coaxial with said shaft and having an end portion mounted on said hub in fluidtight engagement therewith,
    (d) a housing enclosing said motor and having a forward portion spaced from the motor in the direction of the free end of said shaft, said housing having an annular flange defining an aperture receiving a portion of the sleeve adjacent the other end thereof,
    (e) said sleeve being secured to said housing at the flange in fluidtight relation,
    (f) a propeller mounted on the free end of said shaft and rotatable therewith,
    (g) annular sealing rings mounted in said sleeve with fluidtight engagement therewith said sealing rings being spaced apart longitudinally of said shaft and surrounding said shaft in sealing relationship therewith,
(h) non-soluble lubricating material substantially filling the space defined by the shaft and sleeve and the seal rings to prevent moisture from passing along the shaft to the motor.

2. The seal structure as set forth in claim 1 wherein:
(a) said propeller has a short shaft extending therefrom;
(b) said short shaft of said propeller has a socket therein for receiving said free end of said driven shaft;
(c) said elongate sleeve extends outwardly from said flange portion of said housing for rotatably receiving a free end of said short shaft of said propeller therein, said free end of said short shaft is sized for closely fitting within said elongate sleeve.

References Cited

UNITED STATES PATENTS

| | | |
|---|---|---|
| 1,887,540 | 11/1932 | Buchet. |
| 2,116,146 | 5/1938 | Gondek. |
| 2,429,774 | 10/1947 | Schultz et al. |
| 2,824,984 | 2/1958 | Harris. |
| 3,166,362 | 1/1965 | Slaght. |

LAVERNE D. GEIGER, Primary Examiner

JEFFREY S. MEDNICK, Assistant Examiner

U.S. Cl. X.R.

115—18; 277—205, 212, 235